Aug. 4, 1931.                H. E. SIPE                1,817,776
COUPLING
Filed Oct. 23, 1928

INVENTOR
Harry E. Sipe
BY
ATTORNEY

Patented Aug. 4, 1931

1,817,776

UNITED STATES PATENT OFFICE

HARRY E. SIPE, OF NEW YORK, N. Y.

COUPLING

Application filed October 23, 1928. Serial No. 314,443.

This invention relates to couplings and particularly to devices of this class for use in joining adjacent ends of pipes, tubes, rods or the like; and the object of the invention is to provide a coupling body of the class specified involving a plurality of circumferentially and longitudinally spaced metallic ribs arranged at opposite end portions of the coupling and capable of flexing in an inward direction in the operation of securing a pipe, tube or the like in connection therewith; a further object being to provide a coupling of the class specified wherein the ribs constitute a part of the coupling body and means being employed intermediate the ribs to provide yielding fillers or spacing members; a still further object being to provide a coupling involving rib members formed independently of the main body of the device and arranged in the bore thereof in adjacent and abutting relation; and with these and other objects in view, the invention consists in a device of the class and for the purpose specified which is simple in construction, efficient in use, and which is constructed as hereinafter described and claimed.

The invention is fully disclosed in the following specification, of which the accompanying drawings form a part in which the separate parts of my improvement are designated by suitable reference characters in each of the views, and in which:—

Figure 1:
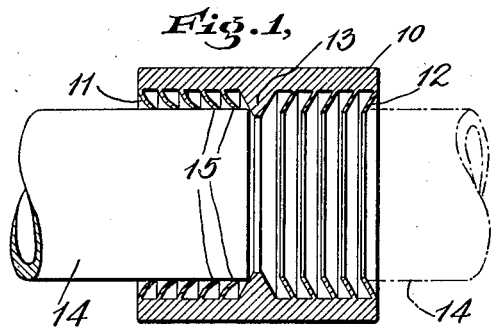
Fig. 1 is a sectional view of one form of coupling made according to my invention and illustrating the method of its use.

In the construction shown in Figs. 1 to 4 inclusive, my improved coupling consists of a unitary body wherein the coupling ribs or fins are formed integral with the main body portion of the coupling. In Fig. 1 of the drawings, the coupling 10 is provided in the bore thereof with longitudinally spaced ribs or fins 11 and 12, the group of ribs 11 being subdivided from the ribs 12 by a central enlarged body 13. The separate ribs of each group 11 and 12 are normally inclined inwardly to a slight extent as clearly seen at the right of Fig. 1 of the drawings and are adapted to be flexed inwardly to a greater degree in the insertion of a pipe or pipes 14 into the opposite ends of the coupling, one pipe being shown in position at the left of said figure. This result is produced by reason of the fact that the outside diameter of the pipe 14 is slightly greater than the diameter of the ribs 11 and 12 so that as the pipe 14 is moved inwardly into the coupling body, the ribs 11 and 12 will flex or yield inwardly to a slight extent, as indicated at 15, placing said ribs under compression to forcibly engage the peripheral walls of the pipe 14. The inward movement of the pipe 14 is checked by the enlargement 13.

Figure 2:
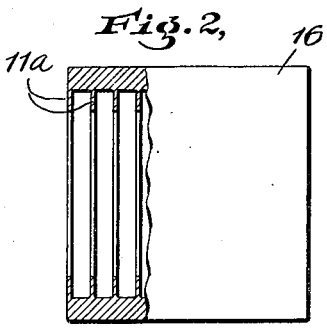
Fig. 2 is a side and sectional view of a modified form of coupling which I employ.

In Fig. 2 of the drawings, I have shown a coupling 16 which is identical to the coupling 10 shown in Fig. 1 except that the ribs coupled at the opposite ends of the coupling are arranged perpendicularly with respect to the axis instead of being inclined inwardly as in Fig. 1. The ribs 11a at one side of the coupling only are shown. In this construction, the ribs 11a of the coupling are flexed in the operation of placing a pipe, tube or the like therein as in Fig. 1 of the drawings.

Figure 3:
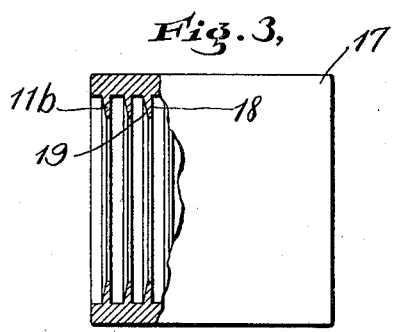
Fig. 3 is a view similar to Fig. 2 showing another modification.

In Fig. 3 of the drawings, I have shown a coupling 17 which differentiates from the couplings shown in Figs. 1 and 2 primarily in that the ribs of the coupling are of tapered construction, the same being tapered inwardly onto the axis of the coupling, and the ribs at one side of the coupling are designated at 11b and are formed by inner straight side walls 18 and outer beveled walls 19.

Figure 4:
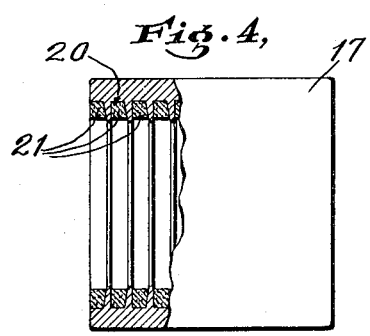
Fig. 4 is a view similar to Fig. 3 showing the use of a resilient spacing body intermediate the ribs of the coupling.

In Fig. 4 of the drawings, I have shown the coupling 17 to illustrate a modified form of construction which may be incorporated in the forms of construction shown in Figs. 1 and 2, and this consists in arranging in the recesses 20 formed between the rods of the separate couplings, rings 21 of yielding material such for example as rubber, felt or compositions of any kind or class.

With this construction, it will be understood that the rings 21 will be placed under compression, and the inside diameters thereof are preferably equal to the outside diameters of the pipes or tubes inserted into the coupling, and in addition to aid in supporting the separate ribs, these rings serve to insure a more positive seal in coupling pipes, tubes or the like together. While the use of the rings 21 is not essential, to effect a seal, it may be found practical to use the same when the peripheral surface of the pipes or tubes are of a rough or uneven nature.

Figure 5:
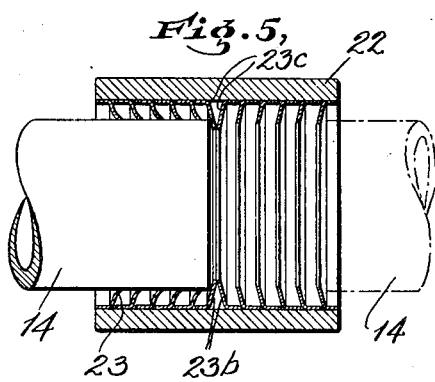
Fig. 5 is a view similar to Fig. 1 but showing another modification.
Figure 6:
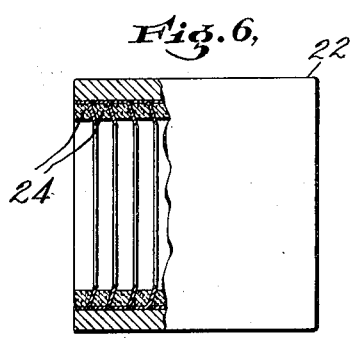
Fig. 6 is a side and sectional view showing a modification of the structure shown in Fig. 5; and, Fig. 7 is a sectional detail view illustrating the manner of forming and mounting the rib members shown in Figs. 5 and 6 of the drawings.
Figure 7:
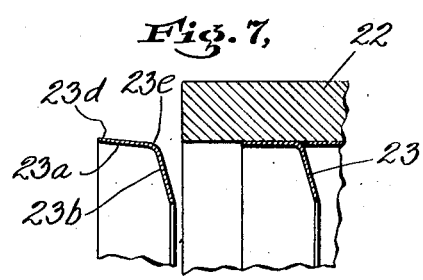

In Figs. 5, 6 and 7, I have shown a modification wherein a tubular coupling body 22 is employed and instead of forming the ribs integral with the tubular body, I arrange on the inner wall of the tube 22, a plurality of rib members 23 which may be formed of any suitable sheet material but preferably metal. These members are L-shaped in cross sectional form to provide a flange portion 23a adapted to firmly engage the inner wall of the tube 22, and a flange portion 23b extending angularly and inwardly with respect to the flange 23a and preferably arranged at an angle to a perpendicular or radial line to form a normal inclination to the rods 23 formed by the flanges 23b. The inclination of said ribs is toward the center of the coupling in the arrangement of said rods at the opposite sides of the coupling as clearly seen in Fig. 5 of the drawings to produce a result similar to that shown in Fig. 1.

It will also be noted that the flanges 23a are arranged in abutting relation with the exception of the innermost members 23c, the latter having slightly longer flanges 23b than the corresponding flanges of the other members 23.

Said flanges 23b abut at the central portion of the coupling as clearly seen to form a stop wall for limiting the inward movement of the pipes or tubes 14. The rib members 23 are flexed in placing the pipes or tubes in the coupling by virtue of the fact that the inside diameters of the flanges 23b are less than the outside diameters of the pipes. It will also be noted on a consideration of Fig. 7 of the drawings, that the flanges 23a of the members 23—23c are preferably flared outwardly to produce a slightly greater diameter at the free edges 23d thereof than at the inner edges 23e thereof, and the diameter at the edges 23d is slightly greater than the inside diameter of the coupling 22 so that the members 23—23c are placed in the coupling 22 under slight pressure, thus maintaining said members in proper position.

In Fig. 6 of the drawings, I have shown spacing rings or bodies 24 disposed between the flanges 23b of the separate members 23—23c, and these function in all respects in the same manner as the rings 21 employed in conjunction with the other structure shown. With my improved coupling construction, it will be understood that pipes, tubes, rods or the like of any desired cross sectional form may be firmly coupled together, maintaining a comparatively rigid and strong and durable coupling between such elements. When pipes or other tubular bodies are employed through which liquids, gases and the like are to be passed or transmitted, the coupling will serve to form a positive seal between adjacent ends of the pipes or tubes by virtue of the multiplicity of rods employed and their separate engagement with the periphery of the members employed, it being understood that each rib or fin has an independent engagement with the pipe or tube.

Where cases warrant it, as a further safety, the rings of yielding material may be employed intermediate the ribs as hereinbefore set forth. While I have shown certain details of construction for carrying my invention into effect, it will be understood that I am not necessarily limited to the structure herein disclosed, and various changes therein and modifications thereof may be made within the scope of the appended claims without departing from the spirit of my invention or sacrificing its advantages.

Having fully described my invention, what I claim as new and desire to secure by Letters Patent, is:—

1. A coupling of the class described comprising a tubular member, the bore of which is provided at the end portions with two sets of similar inwardly projecting flexible metallic ribs, the inside diameters of said ribs being less than the outside diameters of bodies insertable into the opposite ends of said coupling in securing the same thereto, said ribs being flexed inwardly in the direction of the central portion of the coupling in the operation of securing said bodies thereto, placing said rib members under compression to secure said bodies against displacement from said coupling, said ribs being arranged circumferentially of the coupling to form a seal between the coupling and said bodies, and the recesses formed by said ribs containing members composed of yielding material.

2. A coupling member for use in coupling adjacent ends of two bodies comprising a tube, inwardly extending metallic rib members arranged in the bore of said tube and spaced longitudinally thereof, in a closely arranged relation, and rings of yielding material disposed between said rib members.

3. A coupling of the class described comprising a tubular body member, the bore of which is provided with inwardly projecting and longitudinally spaced, annular, flexible, metallic ribs having an inside diameter less than the outside diameter of a body to be connected to said coupling whereby when said coupling is forced onto said body, said ribs will yield inwardly with respect to the coupling to secure said body against displacement from the coupling, and said ribs being circumferentially continuous to form a seal between the coupling and said body.

In testimony that I claim the foregoing as my invention I have signed my name this 19th day of October 1928.

HARRY E. SIPE.